US008025500B2

(12) United States Patent
Puest et al.

(10) Patent No.: US 8,025,500 B2
(45) Date of Patent: Sep. 27, 2011

(54) DECOMPRESSION SPRUE BUSH AND DECOMPRESSION MACHINE NOZZLE

(75) Inventors: Wolfgang Puest, Hofheim-Wallau (DE); Matthias Brinzing, Darmstadt (DE)

(73) Assignee: MHT Mold & Hotrunner Technology AG, Hochheim (DE)

( * ) Notice: Subject to any disclaimer, the term of this patent is extended or adjusted under 35 U.S.C. 154(b) by 78 days.

(21) Appl. No.: 12/311,296

(22) PCT Filed: Sep. 21, 2007
(Under 37 CFR 1.47)

(86) PCT No.: PCT/EP2007/060036
§ 371 (c)(1),
(2), (4) Date: Oct. 19, 2009

(87) PCT Pub. No.: WO2008/040647
PCT Pub. Date: Apr. 10, 2008

(65) Prior Publication Data
US 2011/0027411 A1     Feb. 3, 2011

(30) Foreign Application Priority Data

Sep. 29, 2006   (DE) .................. 10 2006 046 641

(51) Int. Cl.
*B29C 45/20* (2006.01)
(52) U.S. Cl. .................. 425/542; 425/549; 425/810

(58) Field of Classification Search .................. 425/542, 425/810
See application file for complete search history.

(56) References Cited

U.S. PATENT DOCUMENTS
5,773,040 A * 6/1998 Sakamoto et al. ............ 425/810

FOREIGN PATENT DOCUMENTS
| DE | 1454821 A1 | 1/1939 |
| DE | 3616275 A1 | 11/1987 |
| JP | 54055061 A | 5/1979 |
| JP | 63056421 A | 3/1988 |
| JP | 11170320 A | 6/1999 |
| JP | 2004050459 A | 2/2004 |

OTHER PUBLICATIONS

Fred H. Colvin and Frank A. Stanley, American Machinists' Handbook, McGraw-Hill Book Company, Inc.,7th Edition,p. 1302.*

* cited by examiner

*Primary Examiner* — Timothy Heitbrink
(74) *Attorney, Agent, or Firm* — Michael L. Dunn (57) ABSTRACT

The present invention concerns a transfer element (1, 9) for an injection molding system comprising a flow lumen for a plasticised plastic material. To provide a transfer element for an injection molding system, which makes it possible to further increase the material throughput of the injection molding system without having to tolerate increased wear of seals and other system components, it is proposed in accordance with the invention that it has a device for degassing of the flow lumen.

17 Claims, 9 Drawing Sheets

DECOMPRESSION SPRUE BUSH AND DECOMPRESSION MACHINE NOZZLE

BACKGROUND OF THE INVENTION

The present invention concerns a transfer element, in particular a sprue bush or a machine nozzle, for an injection molding system, having a flow lumen for a plasticised plastic material.

The invention further concerns a hot runner system having a sprue bush and an injection molding machine having a machine nozzle.

A sprue system or runner is the connection from the machine nozzle of an injection molding machine to what is referred to as the ingate. The ingate forms the transition from the sprue runner into the mold portion cavity configuration, referred to as the mold cavity. The state of the art discloses hot runner systems for injection molding machines. Such hot runner systems represent the technologically most developed sprue systems or runners for injection molding molds. Hot runner systems serve to distribute the plastic material which is prepared in the injection molding machine in a molten state from the machine nozzle of the injection molding machine to the individual cavities in the injection molding tool. In that respect the hot runner system is temperature-controlled in such a way that the plastic material is kept in the molten state throughout the entire injection molding cycle in the hot runner system. Therefore hot runner systems are frequently also considered as a prolongation of the machine nozzle.

A certain amount of gas is produced during the processing process, during melting and plasticization of plastic materials, in particular PET materials. Presumably the gas contains predominantly substances which are due to additives added to the initial PET material to specifically alter the properties thereof. In that case the gas is produced in particular upon aggregate conversion of the molten material during plasticization by a machine screw by virtue of shearing, heat and overheating, the gas condensing at cooler locations in the injection molding system in the form of dust. That dust is aggressive to a high degree and is deposited in particular at colder parts of the hot runner system. In that case deposit of the dust, in particular in the plunger housings of the needle valves which seal off the hot runner system in relation to the injection molding tool, leads to severe wear of the plunger seals. Therefore many needle valve systems for hot runner systems have vent openings by way of which the dust can escape from the hot runner system before it is deposited in the region of moving parts, for example at the plunger housings of the needle valves, and there gives rise to increased wear.

The amount of dust in the injection molding system increases with the material throughput through the system, that is to say the plasticised amount of plastic material per unit of time. Modern injection molding systems are designed for an increasingly higher level of material throughput which is required in particular by virtue of the increase in the number of mold cavities or molding spaces in the injection molding tools and due to a reduction in the cycle times. Wear in particular in the plunger housings of the valves of the hot runner plate also increases therewith as the increased amount of dust can no longer adequately escape from the system through the vent bores in the plunger housings of the valves.

BRIEF SUMMARY OF THE INVENTION

Therefore the object of the present invention, in relation to that state of the art, is to provide a transfer element for an injection molding system which makes it possible to further increase the material throughput of the injection molding system without having to tolerate increased wear of seals and other system components.

According to the invention that object is attained in that there is provided a transfer element for an injection molding system comprising a flow lumen for a plasticised plastic material, wherein it has a device for degassing of the flow lumen.

In that case the transfer element can be the sprue bush of a hot runner system or the machine nozzle of an injection molding machine. In that respect alternatively the sprue bush and the machine nozzle of the system can also be equipped in accordance with the invention.

The sprue bush forms the transfer element at the hot runner side for introducing the hot plasticised plastic material from the injection molding machine into the hot runner system. In that case the sprue bush is provided for it to cooperate with the machine nozzle of the injection molding machine, in which case a sealing surface of the sprue bush generally comes into engagement with a sealing surface of the machine nozzle in such a way that no plastic material escapes when the plasticised plastic material is transferred from the machine nozzle into the sprue bush of the hot runner system.

In particular, the invention preferably is a transfer element for an injection molding system having a flow lumen for a plasticised plastic material, wherein it has a device for degassing of the flow lumen. The transfer element preferably has a substantially hollow-cylindrical main body having an inner peripheral surface and an outer peripheral surface, wherein the degassing device has at least one gas-permeable passage connecting the inner peripheral surface and the outer peripheral surface.

Further, the main body is preferably of a two-part structure having an upper part and a lower part which are substantially hollow-cylindrical and each have at least one main face, wherein the upper part and the lower part are so arranged that the main faces at least partially butt against each other.

DETAILED DESCRIPTION OF THE INVENTION

The largest proportion by volume of dust-bearing gas is produced in the plasticization operation in the injection molding machine itself so that it is advantageous if that dust-bearing gas from the injection molding machine can already escape from the flow lumen before the plastic material enters the hot runner system. In that way the gas pressure in the flow lumen of the hot runner system is reduced, that is to say decompression takes place.

In a preferred embodiment of the invention the transfer element has a substantially hollow-cylindrical main body having an inner peripheral surface and an outer peripheral surface, wherein the degassing device has at least one gas-permeable passage connecting the inner peripheral surface and the outer peripheral surface. The gas can escape from the transfer element by way of that passage before the gas passes into the hot runner system so that substantially no dust can be deposited in the hot runner system.

Preferably the sprue bush is screwed at its hot runner end to the hot runner system while the machine end of the bush is held in centered relationship by a centering ring in an opening in the plate. In that respect it is particularly advantageous if the gas-permeable passage opens in a region of the outer peripheral surface which is arranged displaced towards the injection molding machine outside the centering ring of the sprue bush. In that way the dust can escape without being deposited at functional elements of the hot runner system.

In a particularly preferred embodiment the main body of the transfer element is at least of a two-part structure comprising an upper part and a lower part which are substantially hollow-cylindrical and each have at least one main face, wherein the upper part and the lower part are so arranged that their main faces preferably concentrically butt against each other. Such a configuration of the main body of the sprue bush is advantageous as it makes it possible for the passage to be arranged in the separation plane between the upper and lower parts of the main body so that the passage or parts thereof can be produced by grinding it free in the main face of the upper and/or lower part of the main body.

In practice the diameters of the sprue bushes of the hot runners are typically so selected that they match the diameter of the machine nozzle of the injection molding machine for which the hot runner system is provided. If a different hot runner system is to be used on the same machine at a later time, then in the systems known from the state of the art the machine nozzle or the entire sprue bush of the hot runner system which is to be newly employed has to be replaced, which is complicated and expensive, in order to ensure functioning of the combination of the injection molding machine and the hot runner system. In comparison the two-part structure of the main body according to the invention has the advantage that the upper part of the sprue bush can be easily exchanged and can serve as an adaptor to permit connection of the sprue bush of a hot runner of any dimension to a predetermined machine nozzle.

In that case it is desirable if the main face of the upper part and/or the lower part has a free-ground clearance so that at least one gap is formed between the main faces, which at least as a portion of a gas-permeable passage connects the inner peripheral surface and the outer peripheral surface of the sprue bush.

In that respect the term free-ground clearance is used to denote a region of small depth, which is recessed out of the main face of the lower or upper part, being produced for example by grinding or milling.

It is crucial in terms of the mode of operation of the degassing device that in the radial direction it has at least one portion which is permeable for the gas while the plasticised plastic material cannot issue through that portion. For that purpose the lumen of that portion which in the present application is referred to as the free-ground clearance must be of a very small gap width at least in one direction. Such a gap is of a small dimension at least in a direction parallel to the axis of the transfer element, that is to say parallel to the through-flow direction, or it is of a small dimension in the peripheral direction. In that respect the reference to a small dimension is used to mean preferably a gap width of less than 0.04 mm, particularly preferably 0.03 mm.

Such a free-ground clearance can be produced in particular of very small depths in the axial direction. The gap formed by a clearance of small depth permits gas to escape without the plastic material being able to escape through such a gap of the sprue bush or the machine nozzle. In that respect a depth for the clearance of less than 0.04 mm and particularly preferably a depth of about 0.03 mm has proven to be advantageous. Such a design configuration permits the escape of a sufficiently large amount of gas while nonetheless no plastic material can issue from the transfer element.

In that respect it is sufficient if the free-ground clearance of the preferred small depth forms the gas-permeable passage only in the region directly adjoining the inner peripheral surface of the main body while the gas passing through the gap is guided further radially outwardly by a passage of larger cross-section or a groove as the small dimension of the degassing passage is required only in the interior of the main body to prevent the plasticised plastic material from also issuing from the transfer element.

A preferred length for the free-ground clearance in the radial direction is between 2 and 3 mm, particularly preferably being 1.5 mm.

In a particularly preferred embodiment the free-ground clearance in the main face of the upper and/or lower part is so arranged that a plurality of gas-permeable passages are formed distributed over the periphery, the passages connecting the inner and outer peripheral surfaces of the main body. In that respect it is particularly advantageous if the individual passages which are at least partially formed by the free-ground clearance are distributed in a star form in the peripheral direction of the transfer element so that gas discharge is possible in all directions.

In a particularly preferred embodiment the free-ground clearance has a substantially circular region which adjoins the inner peripheral surface and which is continuous in the peripheral direction. In such a circular gap gas can issue from the plastic material in all radial directions and can be discharged from the transfer element.

In that respect in an embodiment the connection between the gap formed by the free-ground clearance and the outer peripheral surface of the main body can be made by one or more regions with a free-ground clearance.

Alternatively or additionally there can be provided bores or grooves which extend in the radial direction and which outwardly vent the circular free-ground clearance. The grooves or bores are of a diameter which is larger than the depth of the free-ground clearance. In that way, through bores or grooves involving a lesser consumption of surface area in the peripheral direction, it is possible to discharge the same amount of gas or a larger amount of gas, than through comparable free-ground clearances, in a radial direction. In that way therefore a larger contact surface is afforded between the upper part and the lower part of the sprue bush.

In a further embodiment the peripherally extending free-ground clearance is concentrically surrounded by a degassing groove which is of a larger flow cross-section than the free-ground clearance and which serves to collect the outflowing gas. The gas which issues from the clearance into the peripherally extending degassing groove is guided in the groove to radially extending passages connecting the groove to the outer peripheral surface of the bush.

In a particularly preferred embodiment the upper part and/or the lower part has dowel pins which project from the main face and which engage into bores provided for same in the main face of the respective other part. It is possible in that way to provide for exact assembly of the upper and lower parts of the main body.

Alternatively precise assembly of the upper and lower parts in that way can be achieved by the provision of a mating diameter on the upper and lower parts. With such a mating diameter a portion of the one part which is of an inside diameter that is equal to the mating diameter and a portion of the other part having an outside diameter which is equal to the mating diameter engage into each other and center the parts which are fitted together.

In a further embodiment the main body of the transfer element has more than two parts which are substantially hollow-cylindrical and each have at least one main face, wherein the main faces of two parts at least portion-wise butt against each other, wherein a respective one of the mutually butting parts forms an upper part and the other forms a lower part in accordance with this invention. In that way as described hereinbefore degassing passages for the transfer element can be provided in the butting or separation regions between the parts in more than one plane.

The present object is also attained by a hot runner system having a sprue bush having the above-described features and by an injection molding machine having a machine nozzle having the above-described features.

Further features, advantages and possible uses of the present invention will be apparent from the accompanying Figures and the description relating thereto.

Figure 1:
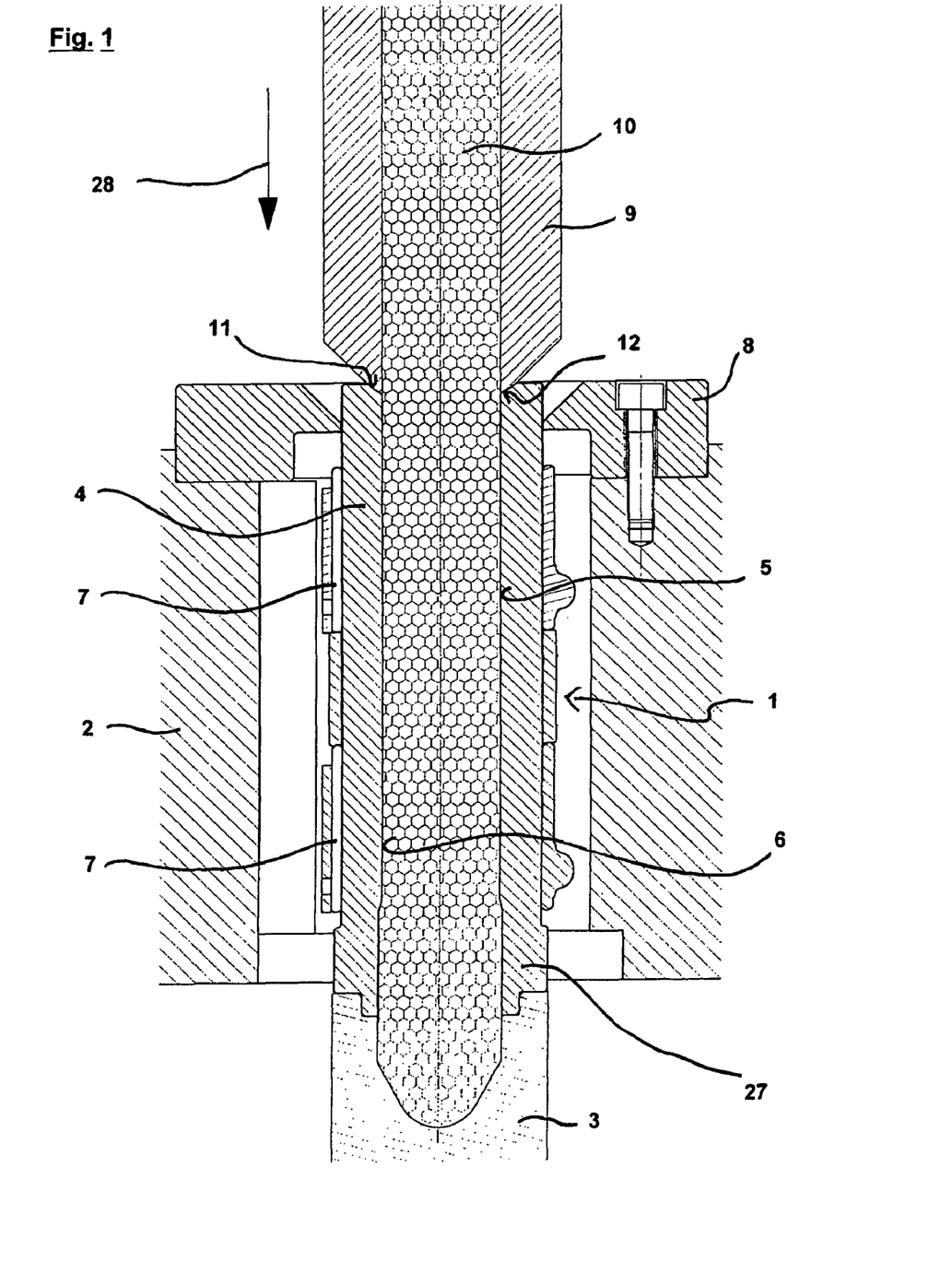
FIG. 1 shows a sprue nozzle of a hot runner system from the state of the art.

FIG. 1 shows a sprue bush 1 for a hot runner system from the state of the art. In that case the sprue bush 1 is let into the cover plate 2 of the hot runner system and opens into the hot runner block 3. The sprue bush 1 has a main body 4 which is of a substantially hollow-cylindrical shape, with an outer peripheral surface 5 and an inner peripheral surface 6. The hollow-cylindrical main body 4 of the sprue bush 1 is annularly surrounded by heating elements 7 so that the fluid plasticised plastic material does not cool down in the main body 4 of the sprue bush 1.

The main body 4 of the sprue bush 1 is screwed at its runner end to the hot runner distributor by means of a flange 27 while the machine end of the main body 4 is held in centered relationship in a suitable opening in the hot runner cover plate by means of a centering ring 8 screwed to the hot runner cover plate 2.

FIG. 1, besides the sprue bush 1, shows a further transfer element, namely the tip of a machine nozzle 9. The machine nozzle 9 and the main body 4 of the sprue bush 1 of the hot runner system butt against each other in such a way that a flow of plasticised plastic material 10 can pass without loss from the machine nozzle 9 into the main body 4 of the sprue bush 1. For that purpose at its upper machine end the main body 4 of the sprue bush 1 has a concentric sealing surface 11. In this case the sealing surface 11 is curved. The machine nozzle 9 also has at its front tip a concentric sealing surface with a curvature. In this case the curvature of the sealing surface 12 of the machine nozzle 9 is greater than the curvature of the sealing surface 11 of the main body 4 of the sprue bush 1. Therefore, when the two transfer elements 4, 9 come into engagement with each other, a line-shaped seal is afforded with a high level of sealing integrity between portions of the sealing surfaces 11, 12.

Figure 2:
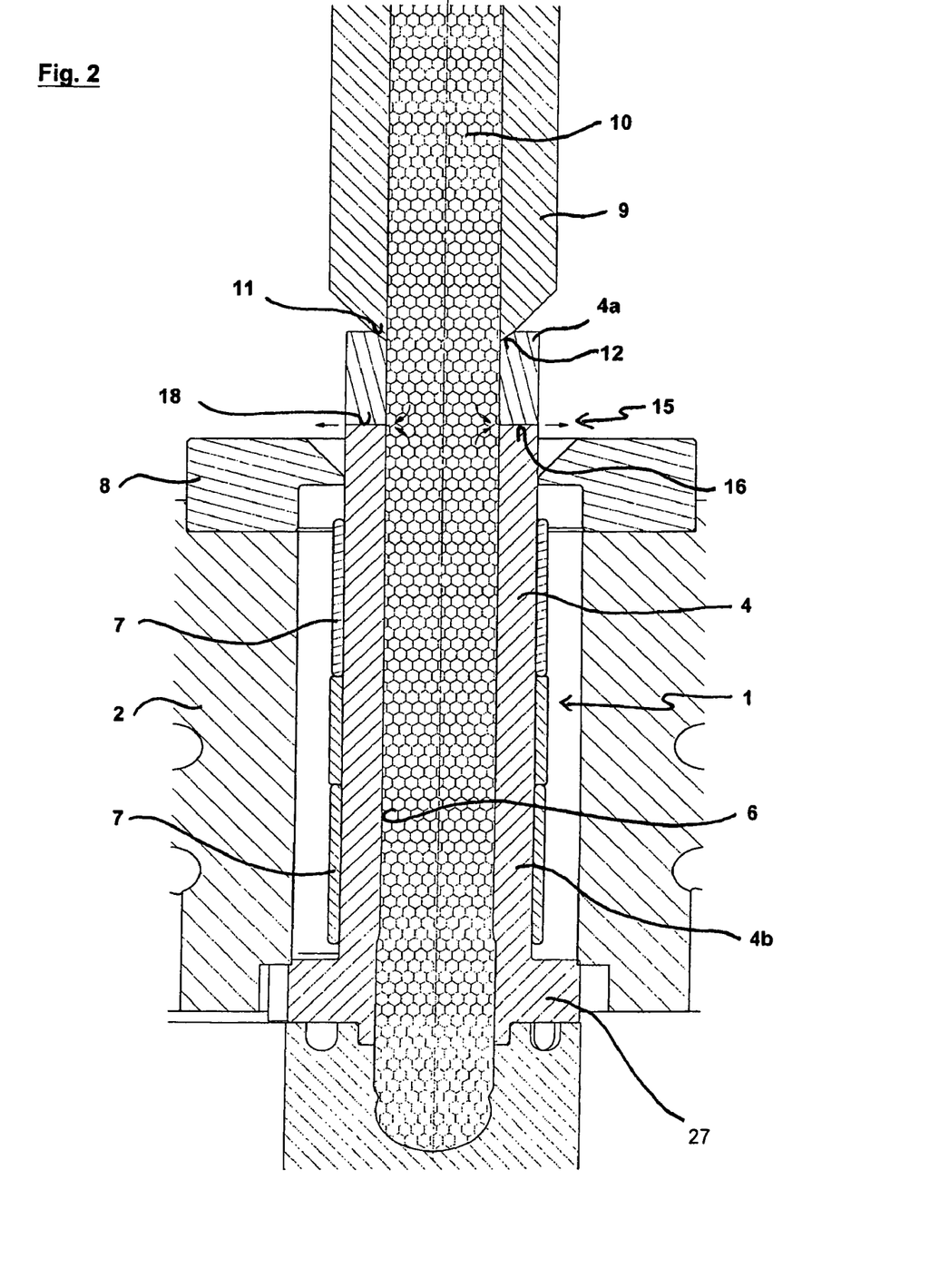
FIG. 2 shows a sectional view of an embodiment according to the invention of a sprue nozzle.
Figure 3:
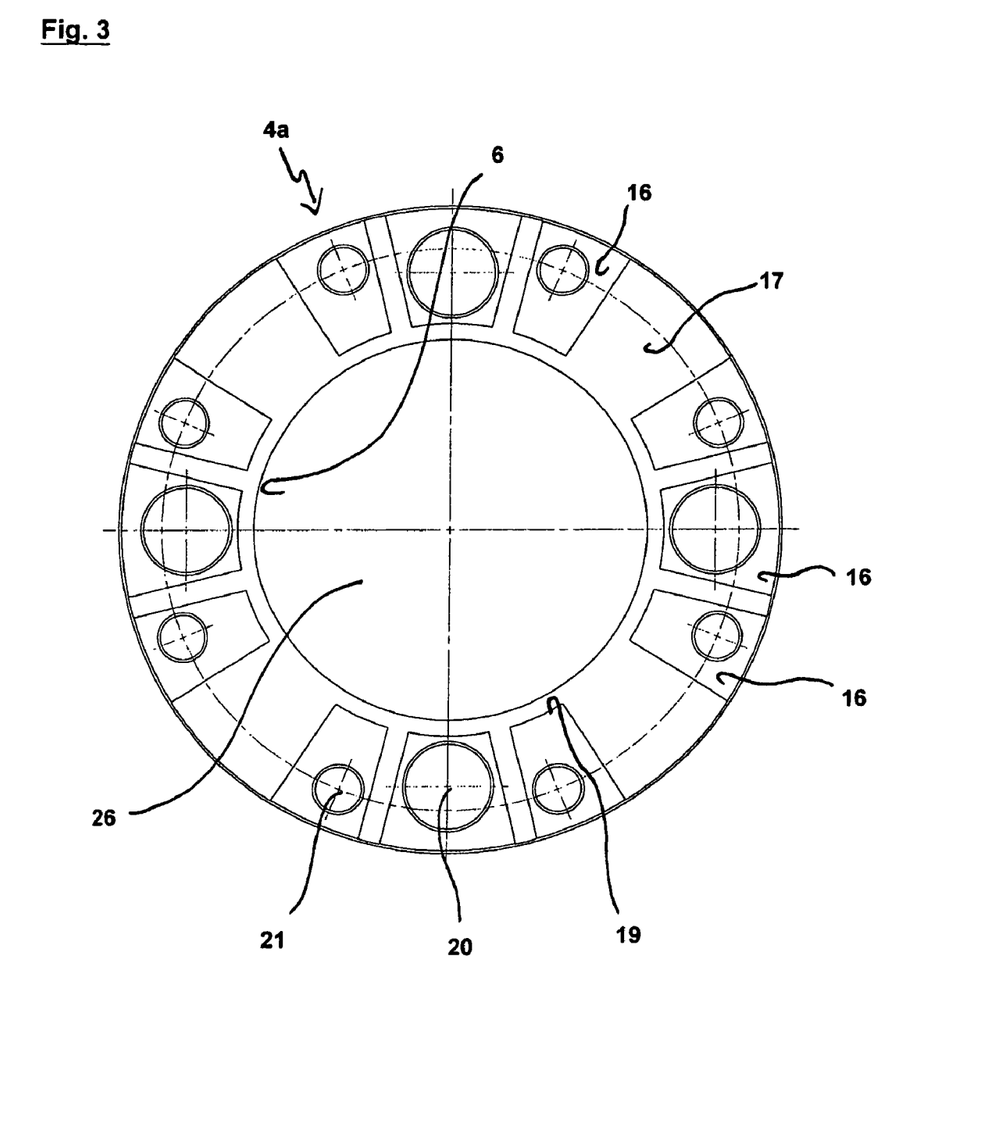
FIG. 3 shows a plan view of the main face or separation face in relation to the lower part of the sprue bush upper part of FIG. 2.
Figure 4:
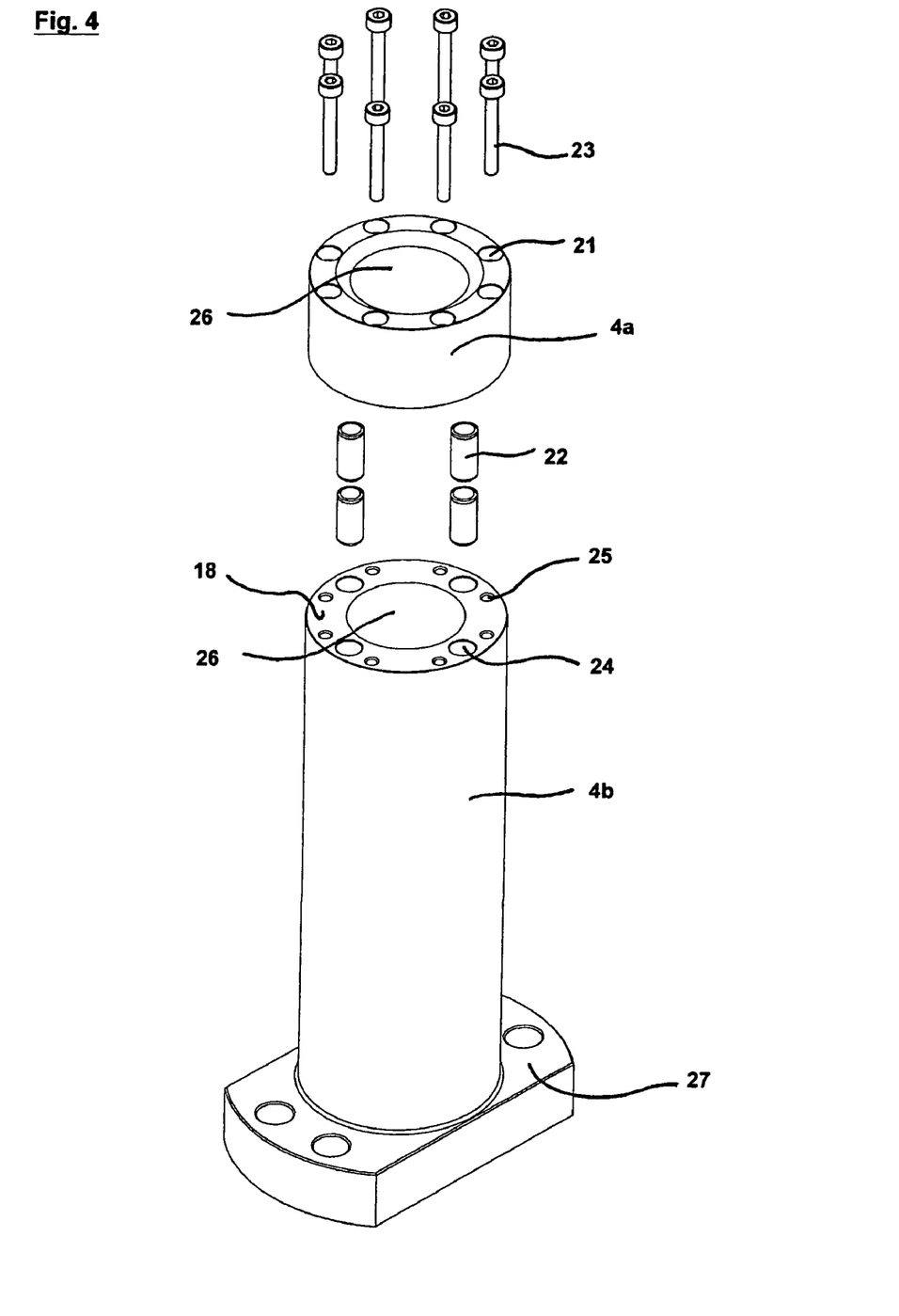
FIG. 4 shows an isometric exploded view of the main body of the sprue bush of FIGS. 2 and 3.

In following FIGS. 2 through 4 showing a preferred embodiment of the present invention the components identical to the sprue bush 1 and the machine nozzle 9 in FIG. 1 are respectively indicated by the same references.

In the sprue bush 1 according to the invention as shown in FIG. 2 the main body 4 is made up from an upper part 4a and a lower part 4b. In this case provided in the butting junction region 15 between the upper part 4a and the lower part 4b of the main body 4 is a passage for degassing of the flow lumen formed by the inner peripheral surface 6 of the main body 4. That passage in the butting region 15 is of such a configuration that its gap width allows gas or dust to pass therethrough while the plasticised plastic material 10 cannot leave the main body 4 of the sprue bush 1.

It can be clearly seen from FIG. 2 that the butting region 15 between the upper part 4a and the lower part 4b of the main body 4 is arranged above the centering ring 8 in the main body 4 of the sprue bush 1. In this arrangement the butting region 15 is displaced with respect to the centering ring 8 in the direction of the machine nozzle 9. That avoids the dust issuing through the through passage being deposited in outside regions of the sprue bush in which it adversely affects operation of the sprue bush.

FIG. 3 shows a view from below onto the main face 16 of the upper part 4a of the main body 4 of the sprue bush 1. The main face 16 of the upper part 4a has a free-ground clearance 17 which, in relation to the faces 16 which come into engagement with the main face 18 of the lower part 4b, involves a difference in height of 0.03 mm. When the upper part 4a and the lower part 4b of the main body 4 are screwed together, then the free-ground clearance 17 results in the provision of a system of passages, which permits degassing of dust from the flow lumen 18 of the main body 4.

In the illustrated embodiment the clearance 17 has an annular region 19 which directly adjoins the inner peripheral surface 6 of the main body so that the gas can escape from the flow lumen 20 in all directions.

In the view onto the main face of the upper part 4a in FIG. 3 it is also possible to see end bores 20, 21. In that arrangement the bores 20 of larger diameter serve to receive centering pins 22 while the bores 21 of smaller diameter are provided for passing fixing screws 23 therethrough.

Screwing and centering of the upper part 4a and the lower part 4b of the main body 4 can be clearly seen in the isometric view in FIG. 4. While centering pins 22 are received in centering bores 24 in the lower part 4b and centering bores 20 in the upper part 4a the fixing screws 23 engage through the bores 21 in the upper part 4a and are screwed into the screwthreaded bores 25 in the lower part 4b. The screw means and the high pressing force 28 with which the machine nozzle 9 is pressed against the sprue bush 1 provide that the parts 16 of the main face of the upper part 4a, that project with respect to the clearance 17, are pressed in force-locking relationship against the main face 18 of the lower part 4b so that only the passages afforded by the clearance 17 permit degassing of the flow lumen 18.

Figure 5:
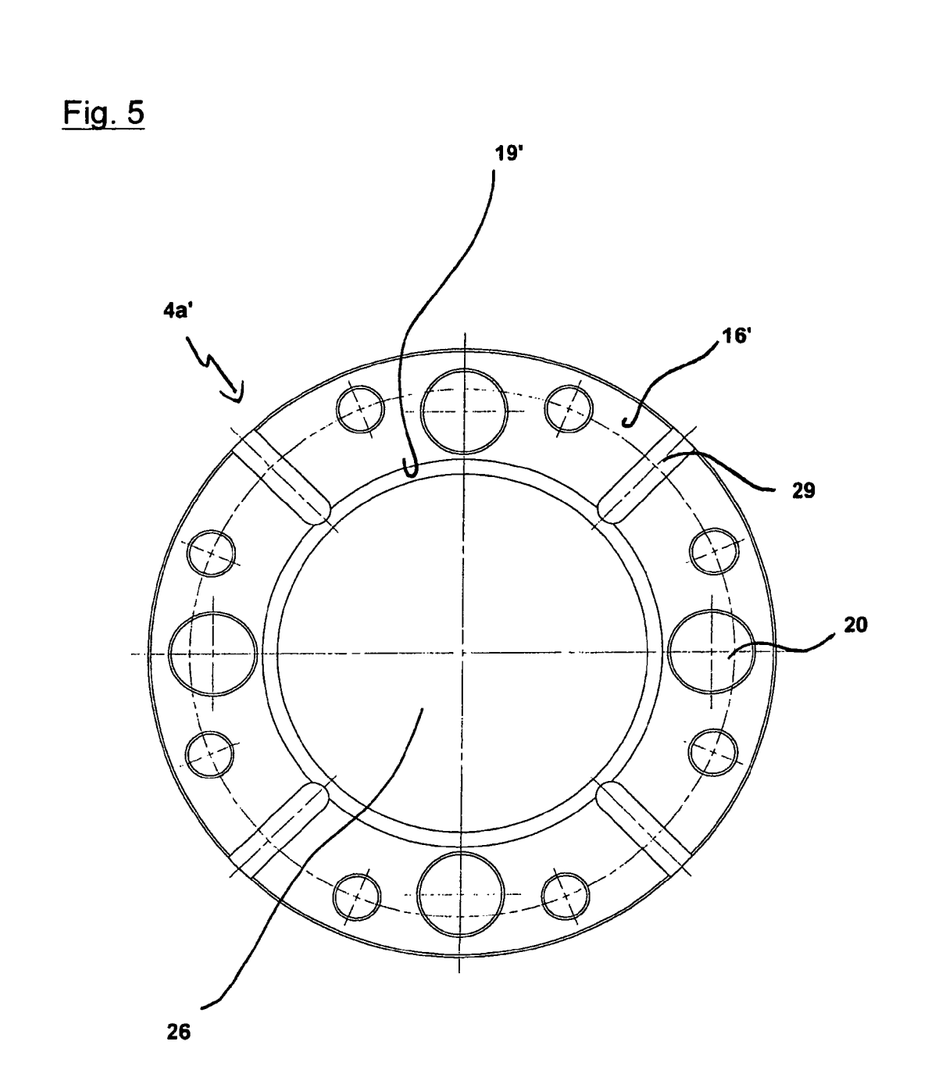
FIG. 5 shows a plan view of the main face or separation face in relation to the lower part of the sprue bush upper part of an alternative embodiment.

FIG. 5 shows a plan view of the main face of an upper part 4a' of an alternative embodiment of the sprue bush 1 according to the invention. Like the above-described embodiment the main face 16' of the upper part 4a' has a circular free-ground clearance 19' directly adjoining the flow lumen 26 of the upper part 4a'. Degassing of the clearance is effected by way of four degassing grooves 29 arranged in a star form around the flow lumen 26. In this arrangement the degassing grooves 29 are of a diameter greater than the depth of the clearance 19'. It is found to be advantageous in this variant that it provides a larger contact face between the upper part (4*a*') and the lower part of the sprue bush.

Figure 6:
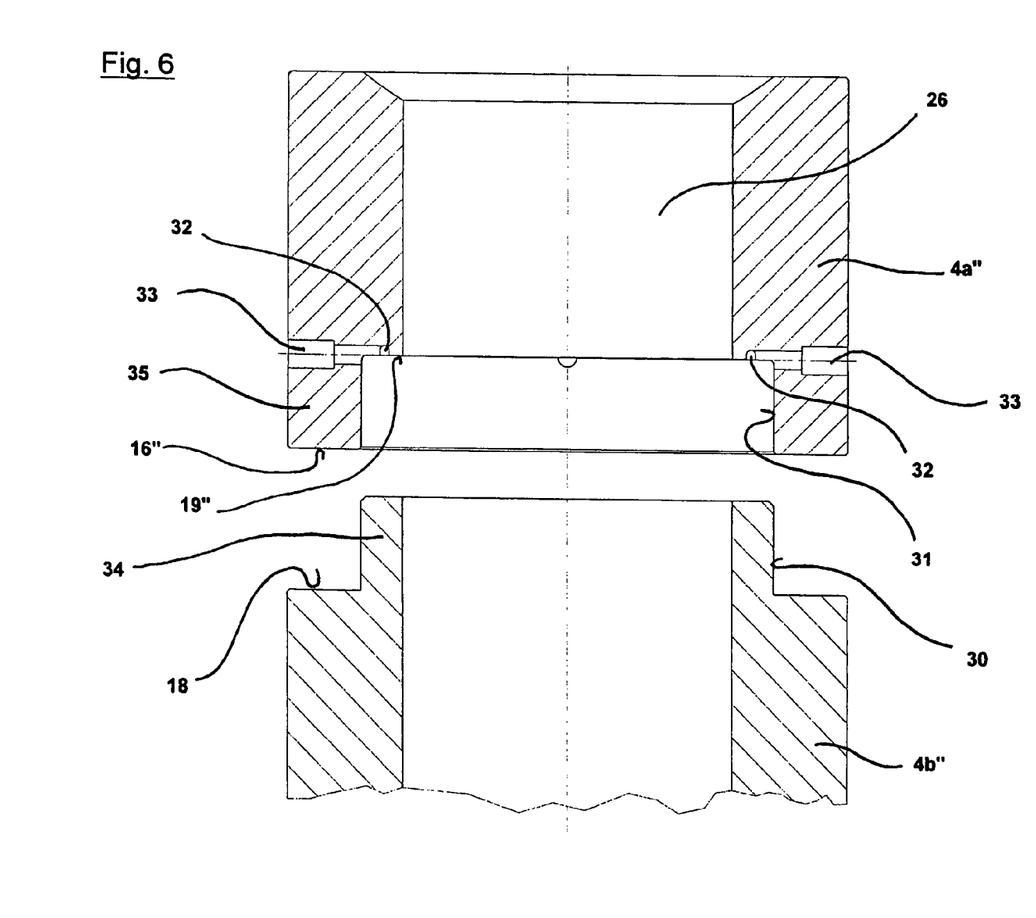
FIG. 6 shows a further embodiment of the sprue bush according to the invention.
Figure 7:
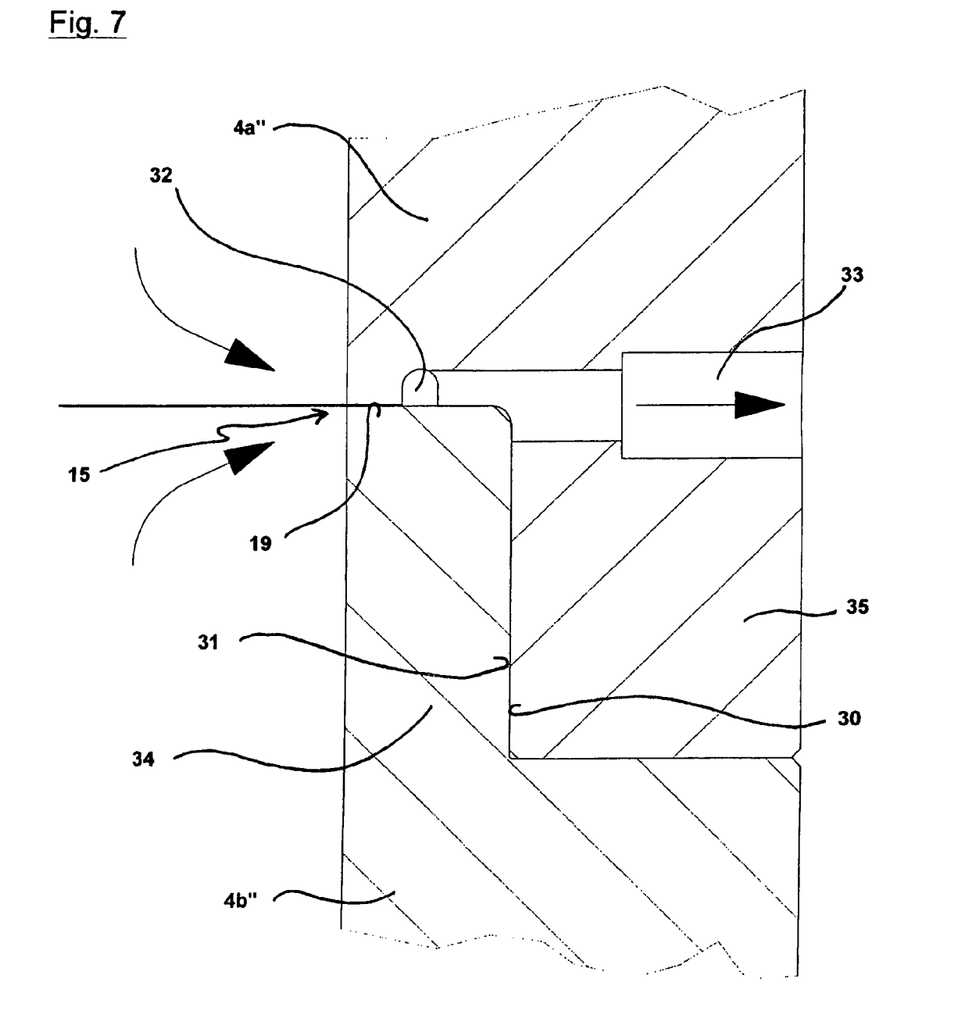
FIG. 7 shows an enlarged view of the sprue bush of FIG. 6.
Figure 8:
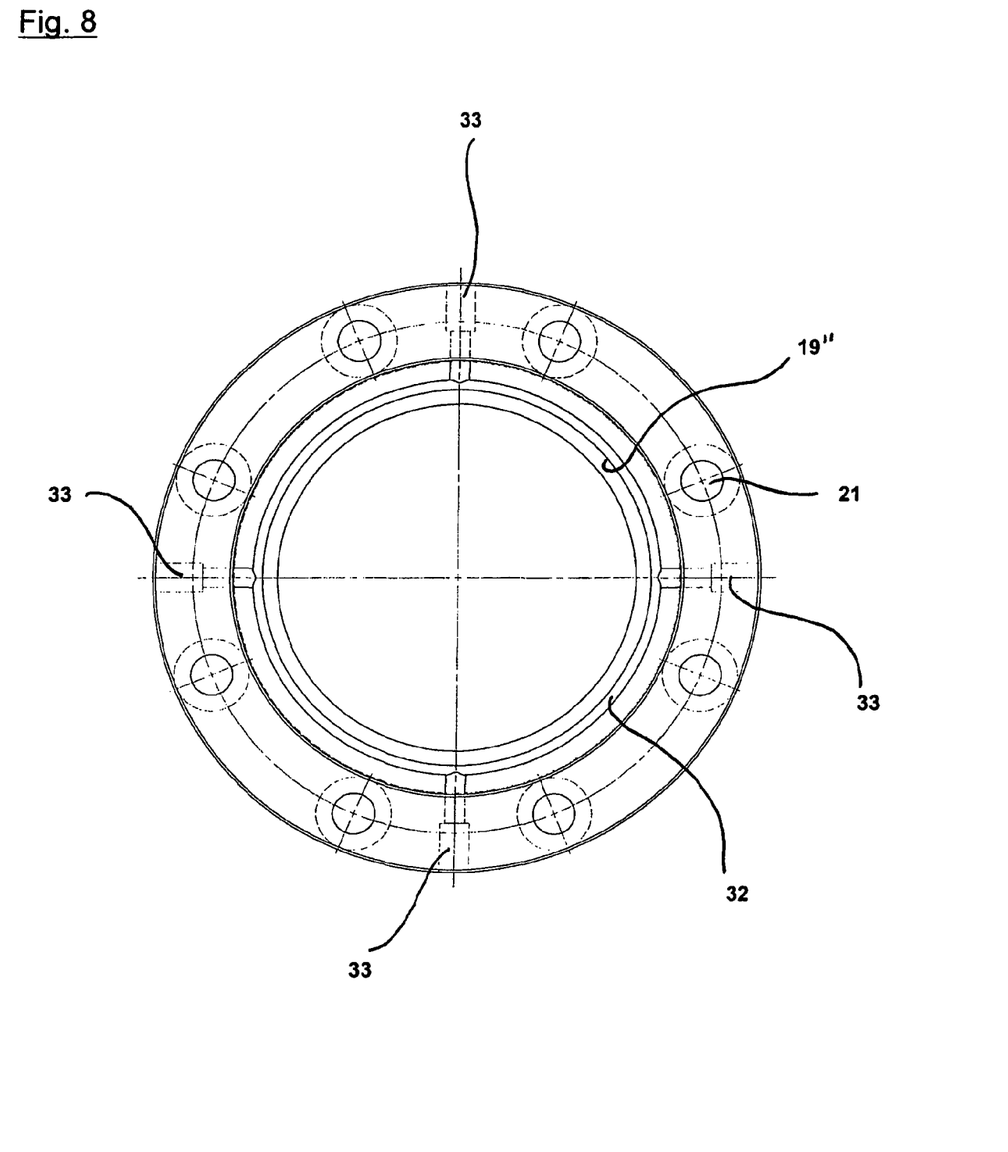
FIG. 8 shows a plan view of the main face or separation face in relation to the lower part of the sprue bush upper part of FIGS. 6 and 7, and FIG. 9 diagrammatically shows the structure of a machine nozzle according to the invention.

FIGS. 6 through 8 show a particularly preferred embodiment of the invention in which the upper part 4*a*" and lower part 4*b*" of the main body of the sprue bush have a mating diameter for centering of the upper part 4*a*" and the lower part 4*b*". By means of such a mating diameter it is possible to absorb high lateral forces which can occur for example due to lateral displacement between the sprue bush and the machine nozzle. For that purpose the lower part 4*b*" has an axially projecting portion 34 whose outside surface 30 is of the same or a slightly smaller diameter than the inside surface 31 of the end 35 of the upper part 4*a*", that is towards the hot runner. After assembly of the upper part 4*a*" and the lower part 4*b*" the axially projecting portion 34 of the lower part 4*b*" engages into the hot runner end of the upper part 4*a*".

The configuration of the degassing device is shown in detail in FIG. 7 illustrating an enlarged view of part of the assembled elements of FIG. 6. It is possible to clearly see a circular free-ground clearance 19" in the main face of the upper part 4*a*", by which a degassing gap is provided in the butting or separation plane 15" between the upper and lower parts after assembly of the upper part 4*a*" and the lower part 4*b*". The clearance 19" opens in the radial direction into a peripherally extending annular degassing groove 32 concentrically surrounding the clearance 19". There the gas escaping from the flow lumen of the sprue bush is collected and is discharged from there outwardly by way of degassing bores 33 which extend in the radial direction and which are distributed in a star form around the periphery of the bush.

FIG. 8 shows by way of explanation a view from below onto the main face of the upper part 4*a*". It is possible to clearly see the concentric arrangement of the clearance 19" and the peripherally extending degassing groove 32. This Figure also clearly shows the arrangement of the four radial degassing bores which are arranged at 90° relative to each other and which open into the peripherally extending degassing groove.

Figure 9:
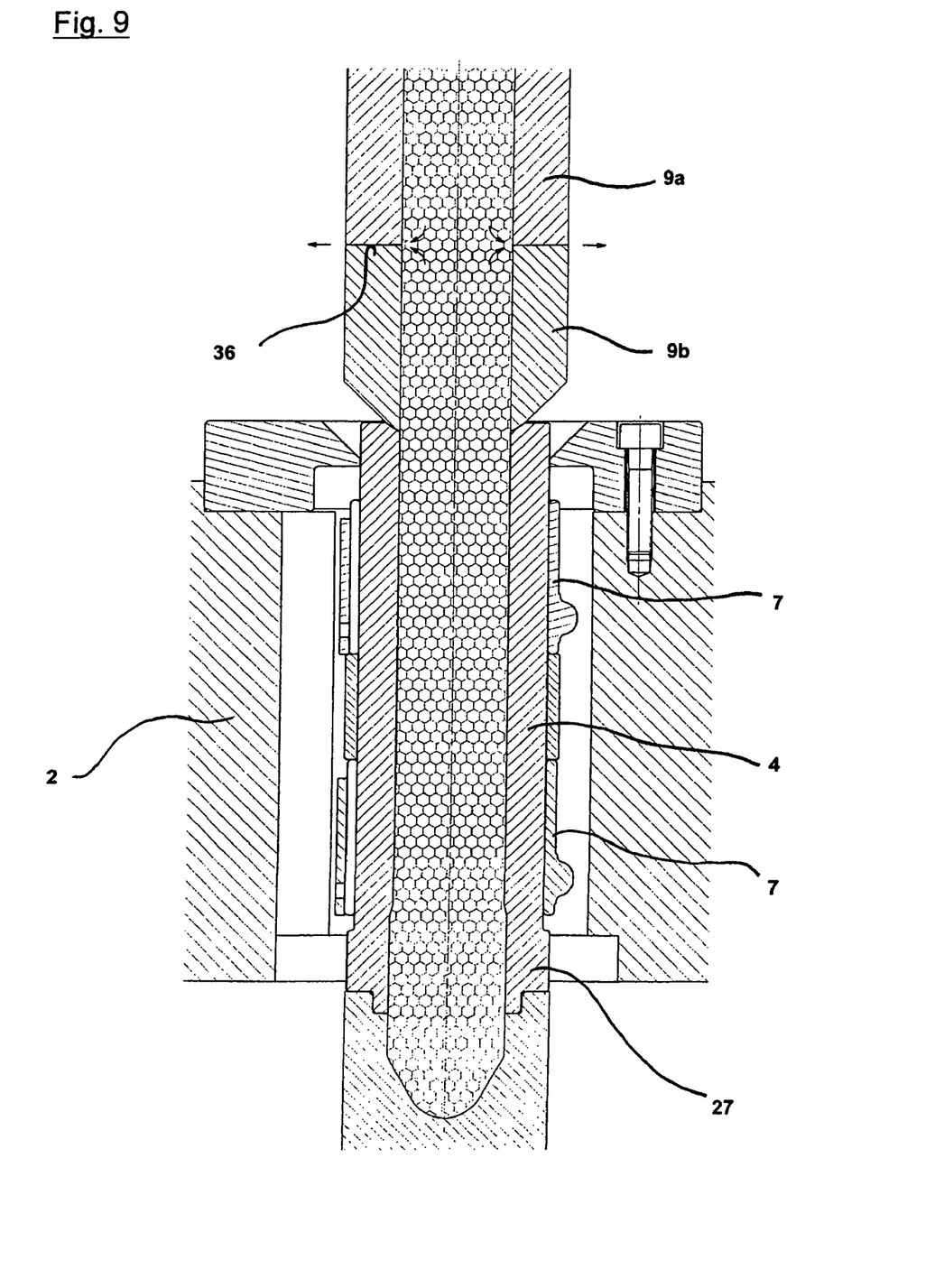

FIG. 9 show a diagrammatic view corresponding to FIG. 2 to illustrate the arrangement and cooperation of a machine nozzle and a sprue bush. In this case, contrary to FIG. 2, it is not the sprue bush but the machine nozzle that is of a two-part configuration so that the degassing device is provided in the machine nozzle. The main body 9 of the machine nozzle comprises an upper part 9*a* and a lower part 9*b*, wherein the nozzle upper part in the illustrated embodiment has a free-ground clearance in its main face 36. A plan view onto the main face of the machine nozzle upper part 9*a* shows, apart from suitably adapted radii, the same structure as the main face of the sprue bush upper part in FIG. 3, with the same functionality as described hereinbefore for the sprue bush. All other configurations of the degassing device for the sprue bush can also be transferred to the machine nozzle.

LIST OF REFERENCES

1 sprue bush
2 cover plate
3 hot runner block
4 hollow-cylindrical main body
4*a*, 4*a*', 4*a*" upper part of the main body of the sprue bush
4*b*, 4*b*', 4*b*" lower part of the main body of the sprue bush
5 outer peripheral surface
6 inner peripheral surface
7 heating element
8 centering ring
9 machine nozzle
9*a* upper part of the machine nozzle
9*b* lower part of the machine nozzle
10 plastic material
11 sealing surface of the sprue bush
12 sealing surface of the machine nozzle
15, 15" butting plane
16, 16" main face of the upper part
17 free-ground clearance
18 main face of the lower part
19, 19', 19" circular region of the free-ground clearance
20 bores in the upper part
21 bores in the upper part
22 dowel pins
23 fixing screws
24 bores in the lower part
25 screwthreaded bores
26 flow lumen
27 flange
28 machine nozzle pressing force
29 degassing groove
30 outside surface with mating diameter
31 inside surface with mating diameter
32 peripherally extending degassing groove
33 radial degassing bore
34 projecting portion
35 hot runner end of the upper part 4*a*"
36 main face of the upper part 9*a* of the machine nozzle

What is claimed is:

1. A transfer element (1, 9) for an injection molding system comprising a flow lumen (18) for a plasticised plastic material, wherein the transfer element has a device for degassing of the flow lumen (18); wherein, the transfer element has a substantially hollow-cylindrical main body (4, 9) having an inner peripheral surface (6) and an outer peripheral surface (5), wherein the degassing device has at least one gas-permeable passage connecting the inner peripheral surface (6) and the outer peripheral surface (5); wherein, the main body (4, 9) is at least of a two-part structure comprising an upper part (4*a*, 4*a*', 4*a*", 9*a*) and a lower part (4*b*, 4*b*', 4*b*", 9*b*) which are substantially hollow-cylindrical and each have at least one main face (16, 18); wherein, the upper part (4*a*) and the lower part (4*b*) are so arranged that there main faces (16, 18) at least partially butt against each other, wherein the main face (16) of the upper part (4*a*, 4*a*', 4*a*", 9*a*) and/or the lower part (4*b*, 4*b*', 4*b*", 9*b*) has a free-ground clearance (17, 19, 19', 19") so that at least one gap is formed between the main faces (16, 18) which at least as a portion of a gas-permeable passage connects the inner peripheral surface (6) and the outer peripheral surface (5) of the main body (4, 9).

2. A transfer element (1, 9) as set forth in claim 1 wherein the gap is of a thickness of less than 0.04 mm.

3. A transfer element (1, 9) as set forth in claim 1 wherein the free-ground clearance (17, 19, 19', 19"), in forms distributed over the periphery of the transfer element gaps between the main faces (16, 18) of the upper part (4*a*) and the lower part (4*b*), at least as portions of gas-permeable passages, connect the inner peripheral surface (6) and the outer peripheral surface (5) of the transfer element.

4. The transfer element of claim 3 where the free-ground clearance forms take the shape of a star form.

5. A transfer element (1, 9) as set forth in claim 2 wherein the free-ground clearance (17, 19, 19', 19"), in forms distributed over the periphery of the transfer element gaps between the main faces (16, 18) of the upper part (4*a*) and the lower part (4*b*), at least as portions of gas-permeable passages, connect the inner peripheral surface (6) and the outer peripheral surface (5) of the transfer element.

6. The transfer element of claim 5 where the free-ground clearance forms take the shape of a star form.

7. A transfer element (1, 9) as set forth in claim 1 wherein the free-ground clearance (17, 19, 19', 19") has a substantially circular region (19) adjoining the inner peripheral surface (6) which is continuous in a peripheral direction.

8. A transfer element (1, 9) as set forth in claim 7 wherein the continuous region (19) of the free-ground clearance (17, 19, 19', 19") at a side remote from the inner peripheral surface (6) opens into a vent bore or a groove (29) which connects the free-ground clearance (17) to the outer peripheral surface (5).

9. A transfer element (1, 9) as set forth in claim 1 wherein the upper part (4a) and/or the lower part (4b) has dowel pins (22) which project from the main face (16, 18) and which engage into bores (20, 24) provided for same in the main face (16, 18) of the respective other part.

10. A transfer element (1, 9) as set forth in claim 1 wherein the outer peripheral surface (5) and the inner peripheral surface (6) of the lower part (4b) and the upper part (4a) in a region adjoining the main faces (16, 18) have mating diameters cooperating so that they center the upper part (4a) and the lower part (4b).

11. A transfer element (1, 9) as set forth in claim 1 wherein the transfer element has a peripherally extending degassing groove (32) into which the free-ground clearance opens.

12. A transfer element (1, 9) as set forth in claim 1 wherein the main body of the transfer element has more than two parts which are substantially hollow-cylindrical and which each have at least one respective main face, wherein the main faces of two parts at least in part butt against each other, wherein a respective one of the mutually butting parts forms an upper part (4a, 4a', 4a", 9a) and the other forms a lower part (4b, 4b', 4b", 9b).

13. A transfer element (1, 9) as set forth in claim 1 wherein the transfer element is a sprue bush (1) for a hot runner system.

14. A transfer element (1, 9) as set forth in claim 1 wherein the transfer element is a machine nozzle (9) for an injection molding machine.

15. A hot runner system having a sprue bush (1) as set forth in claim 13.

16. A hot runner system as set forth in claim 15 wherein the hot runner system has a centering ring (8) for holding the main body (4b) of the sprue bush (1) and a region (15) in which the upper part and the lower part of the sprue bush (1) butt against each other is arranged outside of a centering ring (8) displaced in a direction towards the machine nozzle (9).

17. An injection molding machine having a machine nozzle (9) as set forth in claim 14.

* * * * *